G. H. Clemens,
Saw-Mill Head-Block.
Nº 45,702. Patented Jan. 3, 1865.
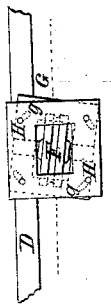
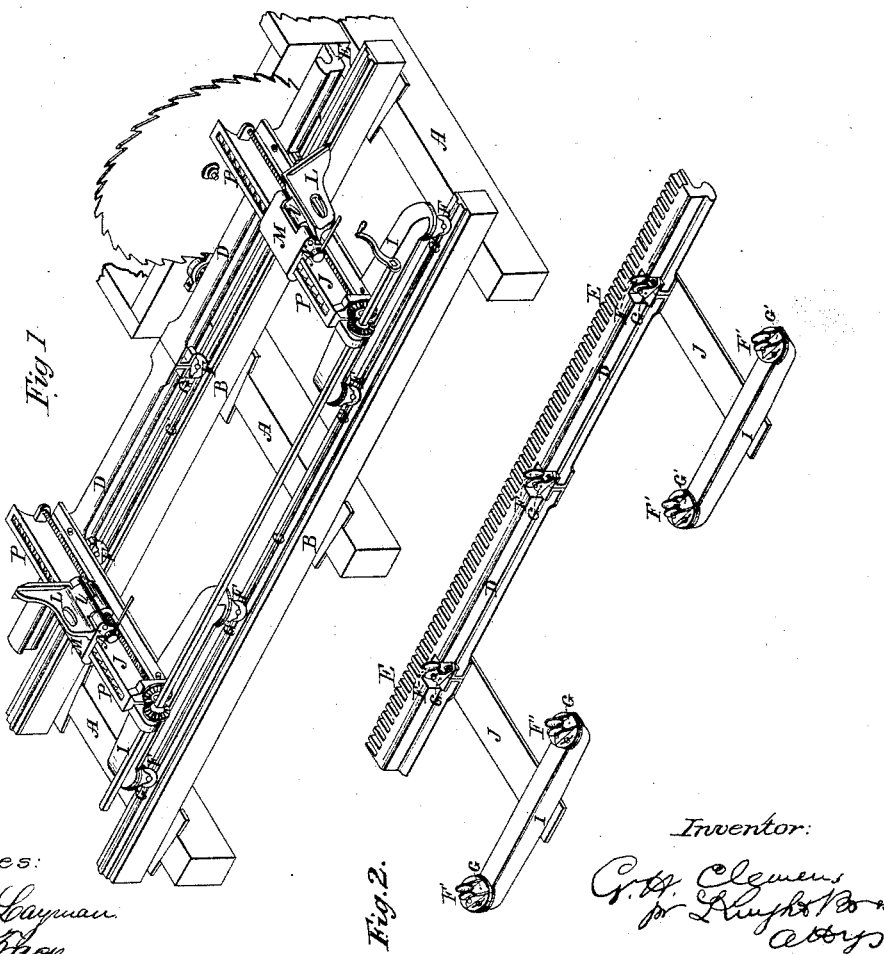
Witnesses:
James H. Layman
R. E. Page
Inventor:
G. H. Clemens

UNITED STATES PATENT OFFICE.

GILBERT H. CLEMENS, OF THE UNITED STATES ARMY.

IMPROVEMENT IN SAW-MILLS.

Specification forming part of Letters Patent No. 45,702, dated January 3, 1865.

*To all whom it may concern:*

Be it known that I, GILBERT H. CLEMENS, of the United States Army, have invented new and useful Improvements in Saw-Mills; and I do hereby declare the following to be a full, clear, and exact description thereof, reference being had to the accompanying drawings, making part of this specification.

My invention relates to, first, a provision whereby a log may be rolled onto its carriage or head-block from behind the knee; secondly, a provision which combines perfect steadiness and accuracy in the forward or effective stroke of the carriage with perfect freedom from the saw in the backward stroke; thirdly, a peculiar arrangement of rack and supporting-wheels.

In the customary mills the act of rolling the log onto the head-blocks is practicable only on the saw side, except by the withdrawal and replacement of the knees—an operation only possible with mills of the smallest class. Yet there are many situations where, from the location of the engine, the disposition of the ground, or other circumstances, it would be far more convenient to feed the mill at its front side or behind the knees. To overcome these difficulties troublesome expedients are frequently necessitated, such as shifting the saw, or even the engine, from side to side, running the carriage entirely clear of the saw, &c.

Another defect common in saw-mills is the liability of the log and carriage to swerve toward and from the saw during the act of cutting, and to rub and beat against the face of the saw on the return-stroke, causing wavy and uneven cutting, besides injuring the saw itself and losing power. To avoid these evils various expedients have been suggested for a lateral play of the saw itself in its bearings. These expedients—all more or less objectionable—I have entirely obviated by my angling wheels, which, by causing the carriage to hug the rear edge of the track, insure a positive rectilinear movement of the log during the act of cutting and a movement entirely clear of the saw on gigging back.

Figure 1 is a perspective view of the preferred type of my improvement. Fig. 2 shows the under side of my carriage. Figs. 3 and 4 are top views of my angling wheels and their pedestals.

A represents the cross-ties.

B B' are the sills, surmounted by railways C C'.

D is the rack-bar, having an inverted rack, E, and wheels F, said wheels being journaled in pedestals G, which are made susceptible of angular horizontal adjustment by the provision of segmental slots $g$ and bolts H.

I are the outer or rear bars of the carriage, connected rigidly to the front bar, D, by means of head-blocks J, and furnished with pedestals G' and wheels F', susceptible of angular adjustment to those above described. Such angular adjustment enables the wheels to be so set as to cause the carriage to hug the rear or guiding edge of the track or way in the forward or effective movement, so as to insure an accurate and positively straight cut, and to hug the front edge of the track on the backward stroke, so as to throw the log entirely clear of any contact with the saw, thereby saving the saw, preventing the scratching of the timber, and economizing power.

The head-block J may be a single solid casting or block, such construction being made possible by the peculiar position of the setting apparatus, as presently explained.

Instead of the usual knee, having the base and standard in one piece, and located at or about the mid-width of the head-block, I construct and arrange my knee in manner following: The vertical position or standard L, which I call the "knee," is situated so as to overreach the extreme right or left side of the block, and is hinged, $l$, at its lower corner to the horizontal plate M, which I style the "base," so as to be capable of being folded down out of the way in the manner represented. The base M may be a solid plate of cast or wrought iron, secured to the head-block by lugs N.

The above arrangement of parts insures several decided practical advantages, namely: The knee having been folded down, a firm, level, and solid bed remains, onto and over which the log may be rolled from either direction without endangering the knee or other part of the machinery. The head-block, being in one solid piece, may be of greater strength within given dimensions than where weakened by the customary slot for the passage of the setting-screw and nut, which slot has been also objectionable as a harbor for dust. This arrangement affords much superior facilities for loading from the rear side than were ever obtained from the front side, where the presence of the saw obliges the carriage to be run entirely clear, either forward or backward. The arrangement is also safer, because the workmen are out of range of blocks and fragments projected from the saw.

The top of my head-block being quite solid, I am enabled to provide in it a series of equidistant indentations, P, marked with consecutive numbers from front to back of the block. These indentations have two uses—namely, to receive the point of a pry or crow-bar, employed to shift the log, and to enable the sawyer to set the knee forward or backward with accuracy. The weight of the knee tends to maintain it in either position at which it may be placed; but for greater security a bolt or other fastening may be applied, or the dog may be so attached as to co-operate in holding the knee.

The setting-screw, being arranged immediately under the knee, brings the power of the setting mechanism to bear in the most direct manner upon the log, yet so as to permit of a solid head-block.

A portion only of the wheels may be set obliquely—as, for example, those upon the rear track only—and it may be found expedient to set the wheels at one end more angling than those at the other end.

The precise angle of obliquity for each wheel having been ascertained by careful experiment, the adjusting feature may be abandoned, if desired, and the wheels may be journaled in fixed bearings in the carriage, so as to dispense with pedestals. These bearings may be provided in the joints of the sections.

I claim herein as new and of my invention—

1. The hinged knee, adapted to be turned down out of the way, in the manner and for the purposes herein specified.

2. The provision of supporting wheels or rollers F, set or capable of being set obliquely to the track, substantially as and for the objects set forth.

3. The wheels F, journaled in pedestals G, susceptible of angular adjustment beneath the carriage, as represented.

In testimony of which invention I hereunto set my hand.

G. H. CLEMENS.

Witnesses:
 GEO. H. KNIGHT,
 JAMES H. LAYMAN.